United States Patent
Wonders et al.

[19]

[11] Patent Number: 6,111,036
[45] Date of Patent: Aug. 29, 2000

[54] METHOD FOR IMPROVING COOLING OF FLUID BED POLYMER REACTOR

[75] Inventors: Alan George Wonders; Mark Alan Edmund; Anthony Dominick Messina; Steven Paul Bellner; Randal Ray Ford, all of Longview, Tex.

[73] Assignee: Eastman Chemical Company, Kingsport, Tenn.

[21] Appl. No.: 08/951,597

[22] Filed: Oct. 16, 1997

Related U.S. Application Data

[60] Provisional application No. 60/028,670, Oct. 17, 1996.

[51] Int. Cl.$^7$ ................................ C08F 2/34; C08F 10/00
[52] U.S. Cl. ................................ 526/68; 526/67; 526/70; 526/88
[58] Field of Search ................................ 526/68, 69, 70, 526/67, 88

[56] References Cited

U.S. PATENT DOCUMENTS

| | | |
|---|---|---|
| 3,595,840 | 7/1971 | Moberly et al. . |
| 4,543,399 | 9/1985 | Jenkins, III et al. . |
| 4,588,790 | 5/1986 | Jenkins, III et al. . |
| 4,640,963 | 2/1987 | Kreider et al. ............................ 526/67 |
| 5,352,749 | 10/1994 | Dechellis et al. . |
| 5,376,742 | 12/1994 | Krause . |
| 5,541,270 | 7/1996 | Chinh et al. ............................ 526/68 |

FOREIGN PATENT DOCUMENTS

| | | |
|---|---|---|
| 94 28032 | 12/1994 | WIPO . |
| WO94/28032 | 12/1994 | WIPO . |

*Primary Examiner*—Fred Teskin
*Attorney, Agent, or Firm*—Jonathan D. Wood; Bernard J. Graves, Jr.; Harry J. Gwinnell

[57] ABSTRACT

Disclosed herein is a fluid bed polymerization process including an improved method for cooling the fluid bed. The recycled fluid stream is cooled by a method comprising a) cooling said gas sufficiently to condense a portion of said gas to a liquid,
b) thereafter separating said liquid from said cooled gas,
c) compressing said cooled gas,
d) thereafter recooling said cooled gas sufficiently to condense a portion thereof to a liquid,
e) reintroducing said liquid portions and said recooled gas into said reactor sufficiently to maintain reactive conditions.

15 Claims, 2 Drawing Sheets

METHOD FOR IMPROVING COOLING OF FLUID BED POLYMER REACTOR

This application claims the benfit of U.S. Provisional Application No. 60/028,670, filed Oct. 17, 1996.

FIELD OF THE INVENTION

The present invention relates to continuous fluid bed chemical reactors. The present invention further relates to a process of cooling the reactor contents during fluid bed polymerization. More particularly, the present invention relates to a process of withdrawing an increased amount of heat from recirculating fluidizing gas before being reintroduced into the reactor.

BACKGROUND

It is well know that many polymers can be exothermically produced as powders in fluid bed reactors wherein the fluidization is provided by a circulating mixture of gases that includes the monomers. It is known that the fluidizing gases leaving the reactor can be recirculated with cooling before reintroduction to the reactor in order to remove the heat of reaction and keep the fluid bed temperature near a desired temperature. Further, it is known that a portion of the recirculating stream may be condensed in coolers (heat exchangers) before re-insertion into the reactor. It is advantageous to remove the latent heat of vaporization, in addition to the sensible heat accumulated in the gas, since the latent heat of vaporization may be much larger per degree of cooling than the sensible heat of the uncondensed stream.

A variety of methods are used for reintroduction of the cooled recycle gas and liquids to the reactor. Often, most of the cooled recycle gas is injected into the reactor through a distributor plate below the fluid bed. The condensed recycle liquids may be entrained in the recycle gas or injected directly into the bed through some sort of nozzle assembly. Examples of the above technologies are shown in U.S. Pat. Nos. 3,595,840, 4,543,399, 4,588,790, 5,352,749, and International Publication WO 94/28032.

A compressor is used to continuously suction the fluidizing gas up out of the reactor so that it can travel through a cooling unit prior to being reinserted into the bottom of the reactor. Int. Pub. WO 94/28032 discloses the efficiencies of condensing a portion of the gas stream and removing the liquid produced therefrom prior to compression of the remaining gaseous recycle stream. Noting that the compressor action adds an additional amount of heat to the recycle stream, Int. Pub. WO 94/28032 further discloses an advantage in cooling the recycle gas again after compression to remove the heat of compression.

Since the rate of fluid bed polymer production is limited by the temperature inside of the fluid bed reactor, the rate of polymer production can be increased as more cooling is provided to the reactor. In light of the above, it would be desirable to provide a continuous fluid bed polymerization process including a method for withdrawing a higher amount of heat from the fluid recycle stream.

SUMMARY OF THE INVENTION

The continuous fluid bed chemical process of the present invention comprises continuously passing a fluid stream comprising reactant monomer through a fluid bed reactor in the presence of catalyst at reaction conditions of temperature, pressure, and fluid flow rate sufficient to form product, withdrawing said product from said reactor, sufficiently introducing makeup monomer into said reactor, said reaction conditions being controlled by cooling at least a portion of the unreacted gas portion of said fluid stream by a cooling method comprising a) cooling said gas sufficiently to condense a portion of said gas to a liquid, b) thereafter separating said liquid from said cooled gas, c) compressing said cooled gas, d) thereafter recooling said cooled and condensed gas sufficiently to condense a portion thereof to a liquid, e) reintroducing said liquid portions and said recooled gas into said reactor sufficiently to maintain reactive conditions.

DETAILED DESCRIPTION OF THE INVENTION

Figure 1:
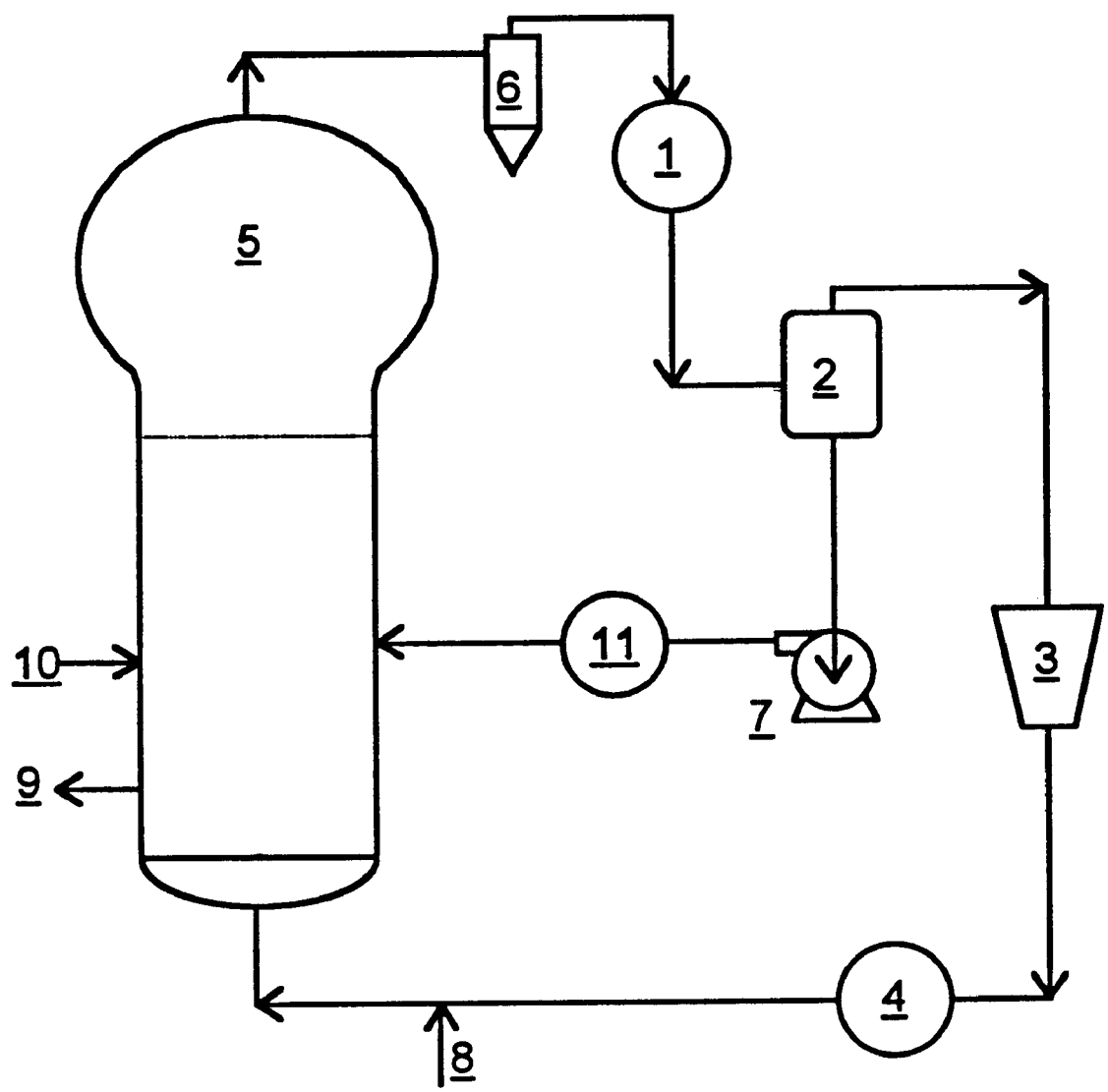
FIG. 1 is a schematic illustration of a fluid bed reactor unit used to carry out the process of the present invention. The reactor unit shown includes a means for subcooling the pre-compressor liquids. Using the apparatus shown, the post-compressor liquids are entrained in the recycle stream as it returns to the reactor.

The applicants were surprised to find a cooling method whereby a relatively small increase in condenser energy capital, when applied to a particular area in the recycle stream, provides an unexpectedly large increasing in the amount of heat withdrawn from the recycle stream. This process thereby provides an unexpectedly large increase in polymer product production rate.

While Int. Pub. WO 94/28032 discloses the benefit of removing the heat of compression from the fluid stream prior to being reintroduced into the reactor, it was unexpected to find that by providing an increased amount of cooling at the post-compression cooler, in addition to the amount of cooling required to remove the heat of compression, that the polymer production rate is increased by a tremendously beneficial amount. The applicants have discovered that, since the compression operation raises the dew point temperature of the recycle stream, it is unexpectedly efficient to remove the latent heat of vaporization after compression, thereby forming a liquid both before and after compression. The increased dew point temperature and condensation of additional liquids allow an important increase in cooling capacity.

In addition, the present invention includes an unexpectedly beneficial fluid bed cooling unit apparatus, not previously contemplated, for cooling, repressurizing the fluid stream, and reintroducing the recycle stream into the reactor as separate streams of gas and liquid. The invention has the advantage of minimizing total energy usage for repressurizing and of maximizing the approach of process temperatures to the temperature of the available coolant source.

The continuous fluid bed chemical process of the present invention comprises continuously passing a fluid stream comprising reactant monomer through a fluid bed reactor in the presence of catalyst at reaction conditions of temperature, pressure, and fluid flow rate sufficient to form product. This continuous circulation is provided while continuously withdrawing said product from said reactor, and sufficiently introducing makeup monomer into said reactor. The reaction conditions of the present process are controlled by cooling at least a portion of the unreacted gas portion of said fluid stream by a cooling method comprising a) cooling said gas sufficiently to condense a portion of said gas to a liquid,
   b) thereafter separating said liquid from said cooled gas,
   c) compressing said cooled gas,
   d) thereafter recooling said cooled and condensed gas sufficiently to condense a portion thereof to a liquid,
   e) reintroducing said liquid portions and said recooled gas into said reactor sufficiently to maintain reactive conditions.

The present process would benefit the production of any polymer that can be made in fluid bed reactors with the injection of volatile cooling liquids into the bed. Though not limited to any particular type of polymer, suitable products include polyolefins, olefin copolymers with alpha-olefins or cyclo-olefins, and polymers made using vinyl monomers. Generally any type of catalyst system is suitable for use in the present process, provided only that the catalyst system will function in a fluid bed reactor with the addition of volatile cooling liquids to the bed. Further, the present process is suitable for use with any type of cooling liquids that can be condensed from the recycle stream for return to the reactor. This includes mixtures of the unreacted monomers and inert, volatile compounds. These volatile compounds may be added to the mixture expressly for the purpose of enhanced heat removal, or they may occur coincidentally due to feed stream impurities or due to side reactions occurring in the reactor loop.

In the preferred process of the present invention, the fluid stream contains monomers including olefins, vinyl monomers, and a combination thereof. The fluidized monomers are more preferably olefins, alpha-olefins, cyclo-olefins, or a combination thereof, with ethylene, propylene, and alpha-olefins being most preferred.

The process of the present invention is not limited to any particular apparatus or piping details for the process operations described. Suitable hardware is known in the art for all the operations described herein. FIG. 1 schematically represents a preferred apparatus for carrying out the present process. With reference to FIG. 1, in process of the present invention, unreacted monomers and inert compounds exit the reactor 5 and pass toward cooler 1. Separating solids by use of separator 6 is optional. It may or may not be advantageous depending on the catalyst, polymer and recycle compression and cooling technology being used. The presence or absence of separator 6 does not affect the novelty and utility of this invention. The process of the present invention is suitable for use with entrained solids in the recycle stream leaving reactor 5.

At cooler 1, sufficient heat is removed in order to condense a portion of the recycle stream. The two-phase (three-phase if solids are present) recycle stream then passes into a separator 2 where most of the free liquid is removed. The separator is preferably a cyclone separator.

Pump 7 preferably pressurizes the condensed liquid from cooler 1 for addition to the fluid bed inside reactor 5, where the volatile liquid vaporizes to provide reactor cooling. Optionally, the liquids from pump 7 may be subcooled with liquid cooler 11. This will remove energy imparted by inefficiencies in the pumping operation. Cooler 11 may also be useful whenever cooler 1 has insufficient heat exchange capacity to allow process temperature to approach closely to the temperature of the coolant supply. It is important that the liquid should vaporize within the bed under the polymerization conditions being employed so that the desired cooling effect is obtained and to avoid substantial accumulation of liquid within the bed. Specific techniques for introducing condensed liquid into the fluid bed for cooling are disclosed in Int. Pub. No. WO 94/28032, incorporated herein in its entirety.

The uncondensed portion of the recycle stream leaves separator 2 and enters a compressor 3. Enough pressure energy must be imparted at the compressor to cause the recycle stream to circulate continuously. The compression operation inherently raises the temperature of the recycle stream. Any lost work on the process side of the compressor adds further to the temperature rise.

Upon exiting compressor 3, the compressed gas passes into a second cooler 4. Rather than simply removing the heat of compression, the process of the present invention includes condensing the fluid at this point from the recycle stream. The higher pressure at this point makes is possible to condense additional liquids from the recycle stream, increasing the thermal efficiency of the process, reducing overall energy usage and reducing overall system costs. As shown in FIG. 1, the liquids condensed in cooler 4 may be left in the main recycle stream. The combined two-phase flow (three-phase if solids are present) may be carried to the bottom of the reactor and introduced into the bed through the grid. Technology is well know in the art for entraining the liquid (and solids if present) in the gas flow.

Figure 2:
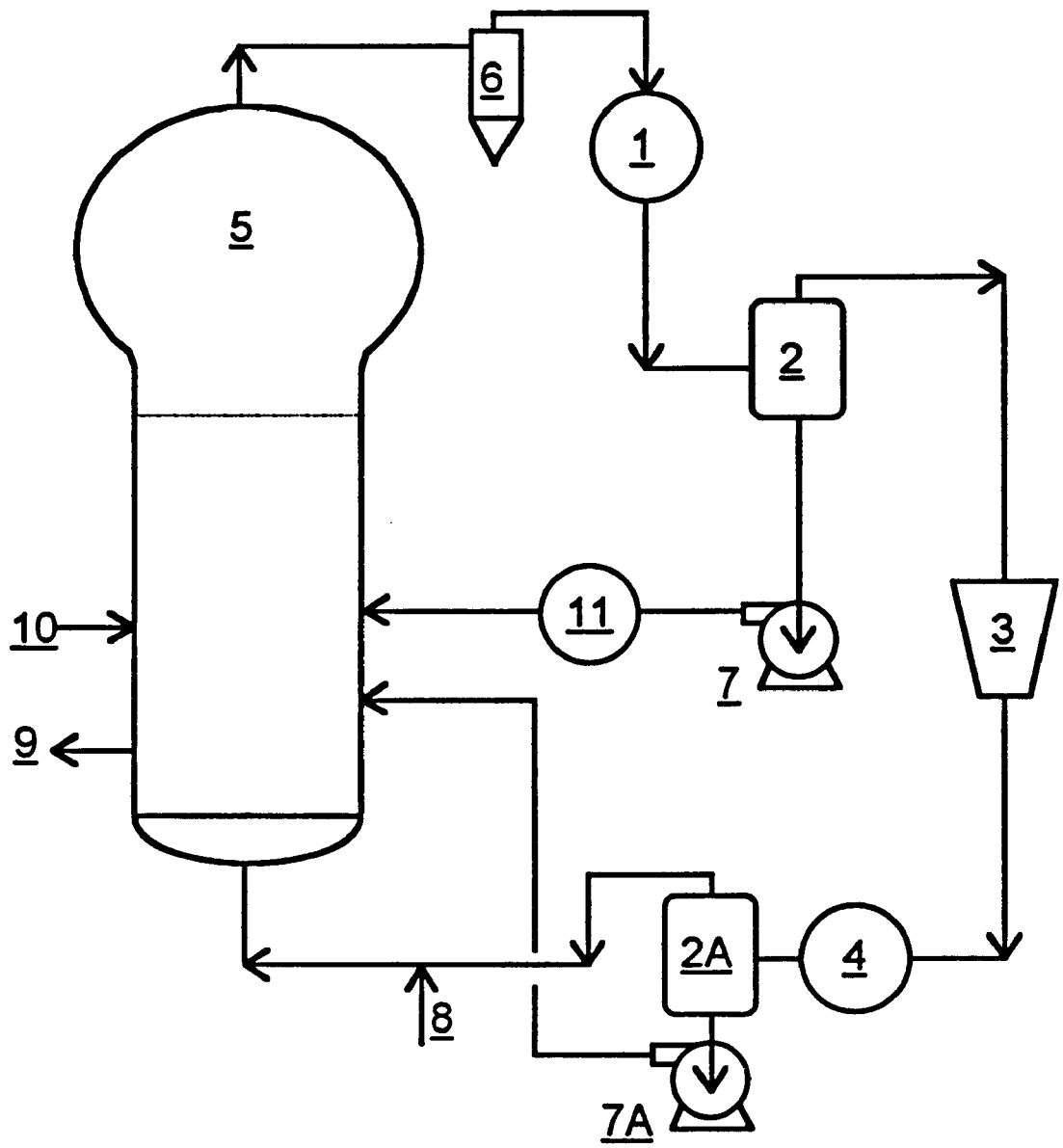
FIG. 2 is a schematic illustration of the fluid bed reactor of the present invention for use in the embodiment of the process of the present invention comprising the separation and pumping of essentially all condensed liquids.

FIG. 2 shows an alternate embodiment of the process of the present invention. It differs in that the multiphase flow from cooler 4 is passed into a separator 2A, with separated liquids being sent back to the reactor via pump 7A. These liquids may be combined with the liquids before or after cooler 1, or the liquids may be injected separately to the fluid bed.

In both figures, stream 8 represents makeup monomers, inert compounds and chain terminator compounds. Stream 9 indicates the withdrawal of solid polymer along with unreacted monomers, inert compounds and chain terminator compounds. Stream 10 indicates the injection of the catalyst system. For each of these streams, there are various methods and locations known in the art for addition either to the reactor or to the recycle stream flow. Particular advantages and disadvantages accrue to the particular methods and locations, but the particular methods and location do not impede the novelty or utility of the current invention.

In like manner, diversion of part of the recycle stream flow to purposes other than cooling is included in the present process. Non-limiting examples of such other purposes include a recycle loop purge stream for composition control, motive gas for induction of fines or catalyst into the fluid bed, control of fluidization velocity through the reactor, control of gas phase composition at specific locations within the reactor, and establishment of unique circulation patterns within the reactor.

Each of the equipment items shown as coolers 1, 4 and 11 may be multiple, physically separate units, such as multiple heat exchangers in parallel or series or both, even with different coolant temperatures, within the scope of this invention. Particular advantage may accrue to having two exchangers in series wherein the upstream exchanger uses a low cost coolant source, such as cooling water, to remove a large part of the heat duty and the second exchanger uses a refrigerated cooling source to condense even more liquids in the process stream.

The fluid flow rate of the present process of preferably such to provide a superficial fluidization velocity through the reactor of about 30 to 100 cm per second, more preferably about 50 to 90 cm per second. Superficial fluidization velocity is determined by dividing the velocity of gas in the reactor by the cross sectional area of the empty reactor.

The unexpected benefits of the process of the present invention accrue from condensing cooling liquids both before and after compression of all or part of the recycle gas stream. The process of the present invention preferably provides a heat removal capacity of about $1\times10^5$ to about $1\times10^8$ kcal per hour, more preferably at least $1\times10^6$ kcal per hour. The heat removal of the present process is preferably to such an extent that the fluid bed temperature is maintained at a temperature of about 20 to about 150° C., more preferably about 40 to 120° C.

The present invention further includes the cooled fluid bed reactor unit represented by FIG. 1. This apparatus comprises a fluid bed reactor comprising a fluidization grid near the bottom of said reactor, an unreacted gas outlet at about the top of said reactor, a cooling and fluidizing fluid inlet below said fluidization grid, a liquid inlet above said fluidization grid, said unreacted gas outlet being connected to said cooling and fluidizing inlet and said liquid inlet by way of a cooling unit comprising a first cooler connected downstream to said unreacted gas outlet, said first cooler being further connected to a gas/liquid separator that is further connected to a compressor that is further connected to a second cooler that is further connected to said reactor cooling gas inlet, further wherein said gas/liquid separator is also connected to a pressurizing pump that is further connected to a third cooler that is further connected to said liquid inlet, even further wherein said compressor is capable of providing enough pressure energy to continuously circulate fluid through said fluid bed reactor unit.

The following example is intended to further illustrate the present invention, but should not be construed as a limitation thereon.

EXAMPLE

This example illustrates the unexpectedly high increase in cooling capacity provided by the process of the present invention as conducted using a preferred embodiment of the cooled fluid bed reactor unit of the present invention. The process of the present invention was conducted using a cooled fluid bed reactor unit represented by the schematic diagram shown in FIG. 2. The fluidized bed reactor was operated with a combined recycle flow of about 2.6 million pounds per hour (1.18 million Kg/hr). A copolymer of ethylene and hexene-1 was produced using a Ziegler catalyst. The composition of the recycle stream entering cooler 1 is shown below.

| Component | Mole % |
|---|---|
| methane | 0.1 |
| ethane | 1.8 |
| ethylene | 27.8 |
| C4 hydrocarbons | 1.0 |
| hexene-1 | 4.0 |
| hexene-2 | 1.1 |
| saturated C6 hydrocarbon | 3.1 |
| saturated hydrocarbon > C6 | 0.1 |
| hydrogen | 5.9 |
| nitrogen | 55.1 |

Reactor outlet pressure was 315 psia (2.17 megapascal) at a temperature of 86° C. The recycle stream outlet from cooler 1 was cooled to about 56° C., removing approximately 87 million BTU/hr (21.9 million kcal/hr). Approximately 11 weight percent of the recycle stream was condensed to liquid at the outlet of cooler 1. This liquid was pumped to a pressure of 470 psia (3.24 megapascal) and discharged to cooler 11 using about 120 horsepower (89 kilowatts) of mechanical power. The energy used to return the condensed liquid to the reactor was thus about 1 BTU per pound (0.56 kcal/kg) of process fluid. In cooler 11, an additional 6 million BTU/hr (1.5 million kcal/hr) of sensible heat was removed by sub-cooling the condensed liquid mixture to 38° C.

The pressure at the inlet to cooler 4 was raised to 330 psia (2.28 megapascal) by compressor 3, using about 6,500 horsepower (4,850 kw) of mechanical power. The energy used to return from the overhead of separator 2 to the reactor was thus about 7 BTU per pound (3.89 kcal/kg) of process fluid, 7 times more than for the liquid returned from the bottom of separator 2.

The power required in compressor 3 is about 10 percent less than if the remaining gas stream from atop separator 2 were compressed beginning at a suction temperature of 86° C. This further reduces the size and capital cost of compressor 3, the cost for compressor power, and the amount of total heat that must be removed in coolers 1, 4, and 11.

Energy loss in highly turbulent flow is known to vary approximately with the square of the mass flow rate. Therefore 11 weight % of the mass at separator 2 was removed, reducing the subsequent flowing pressure loss in the main recycle stream by about 23%. With the facilities particular to this example, the flowing pressure losses were reduced by about 2 psia (0.014 megapascal) from separator 2 into the fluid bed of reactor 5 . This represented a further savings in compression energy of about 5%, again reducing costs for compressor 2, compressor power and coolers 1,4, and 11.

About 46 million BTU/hr (11. million kcal/hr) of heat were removed in cooler 4, where the coolant supply temperature limited the process temperature to about 44° C. It is important to note that if no condensation were practiced in this exchanger, heat removal would have been limited to about 7 million BTU/hr (1.8 million kcal/hr), significantly reducing the amount of polymer produced.

In the example shown above, the total heat removal of about 139 million BTU/hr (35.0 million kcal/hr) enabled the production of about 83,600 lb/hr (37,900 kg/hr) of the ethylene-hexene copolymer, significantly more than would have been produced if the liquids were not condensed in coolers on both the suction and discharge of the compressor.

What is claimed is:

1. A continuous fluid bed chemical process comprising: continuously passing a fluid stream comprising reactant monomer through a fluid bed reactor in the presence of catalyst at reaction conditions of temperature, pressure, and fluid flow rate sufficient to form product, withdrawing said product from said reactor, sufficiently introducing makeup monomer into said reactor, said reaction conditions being controlled by cooling at least a portion of an unreacted gas portion of said fluid stream by a cooling method comprising:

a) cooling said unreacted gas sufficiently to condense a portion of said unreacted gas to form a liquid and a cooled gas, b) thereafter separating said liquid from said cooled gas, c) compressing said cooled gas, d) thereafter recooling said cooled gas sufficiently to condense a portion thereof to form a liquid and a recooled gas, e) reintroducing said liquid portions and said recooled gas into said reactor sufficiently to maintain reactive conditions.

2. The process of claim 1 wherein said liquid formed upon recooling step d) is entrained in said gas when reintroduced into said reactor.

3. The process of claim 1 wherein said liquid formed upon recooling step d) is separated from said gas prior to being reintroduced into said reactor.

4. The process of claim 1 wherein said liquid from steps b) and d) is pressurized prior to being reintroduced into said reactor.

5. The process of claim 1 further wherein, after being separated from said gas, said liquid is further cooled.

6. The process of claim 1 wherein said makeup monomer is introduced into said reactor by being added to said unreacted gas portion of said fluid stream.

7. The process of claim 1 wherein said process further comprises separating entrained solids away from said cooled gas from step b).

8. The process of claim 1 wherein said monomers are selected from the group consisting of olefins, vinyl monomers, and a combination thereof.

9. The process of claim 8 wherein said monomers are selected from the group consisting of olefins, alpha-olefins, cyclo-olefins and a combination thereof.

10. The process of claim 9 wherein said monomers are a combination of ethylene and alpha-olefins.

11. The process of claim 1 wherein a portion of said unreacted gas portion of said fluid stream is diverted to a process operation other than cooling, said process operation being selected from the group consisting of a loop purge stream, motive gas for introduction of materials into said reactor, control of fluid flow rate, control of gas phase composition, circulation control, and a combination thereof.

12. The process of claim 1 wherein the heat removal capacity is about $1\times10^5$ to $1\times10^8$ kcal per hour.

13. The process of claim 1 wherein said fluid flow rate provides a superficial fluidization velocity through the reactor, determined by dividing the velocity of gas in the reactor by the cross sectional area of the empty reactor, of about 30 to 100 cm per second.

14. The process of claim 1 wherein the reaction temperature in said fluid bed is maintained at a temperature of from about 20 to 150° C.

15. The process of claim 14 having a fluid bed reaction temperature of about 40 to 120° C.

* * * * *